US006364980B1

(12) United States Patent
Smith et al.

(10) Patent No.: US 6,364,980 B1
(45) Date of Patent: Apr. 2, 2002

(54) HAZARDOUS ENVIRONMENT PROTECTIVE GARMENT HAVING A FUSION BONDED OPTICALLY TRANSPARENT FACEPIECE WITH CHLORINATED POLYOLEFIN SEAMS

(75) Inventors: W. Novis Smith; Joel McCloskey, both of Philadelphia, PA (US); Kelly Bradford, Cullman, AL (US)

(73) Assignee: Lakeland Industries, Ronkonkoma, NY (US)

( * ) Notice: Subject to any disclaimer, the term of this patent is extended or adjusted under 35 U.S.C. 154(b) by 0 days.

(21) Appl. No.: 09/164,732

(22) Filed: Oct. 1, 1998

Related U.S. Application Data

(63) Continuation of application No. 08/656,701, filed on Jun. 3, 1996, now abandoned, which is a continuation of application No. 08/378,184, filed on Jan. 25, 1995, now abandoned.

(51) Int. Cl.[7] .................................................. B60J 1/00

(52) U.S. Cl. .............................. 156/108; 2/275; 2/424; 156/306.6; 156/333; 525/334.1

(58) Field of Search .............................. 156/108, 306.6, 156/333; 525/334.1; 2/275, 424

(56) References Cited

U.S. PATENT DOCUMENTS

| | | | | | |
|---|---|---|---|---|---|
| 3,695,967 | A | * | 10/1972 | Ross | 156/306.6 |
| 4,272,851 | A | * | 6/1981 | Goldstein | 2/275 |
| 4,670,073 | A | * | 6/1987 | Langley | 2/275 |
| 4,725,506 | A | * | 2/1988 | Nagano | 525/334.1 |
| 4,864,654 | A | * | 9/1989 | Schriver et al. | 2/424 |

* cited by examiner

*Primary Examiner*—John J. Gallagher
(74) *Attorney, Agent, or Firm*—John Lezdey & Assoc

(57) ABSTRACT

The invention provides a process, and product thereof, for forming a chemically resistant fusion bonded seal between chemically dissimilar materials by use of a chlorinated polyolefin film for protective garments. The process involves placing the chlorinated polyolefin film between two dissimilar films such as a facepiece and the fabric film of the garment and applying heat and pressure. The resulting fusion bonded film composite is strong, flexible and upon the application of sufficient stress exhibits total cohesive rupture failure.

15 Claims, 2 Drawing Sheets

HAZARDOUS ENVIRONMENT PROTECTIVE GARMENT HAVING A FUSION BONDED OPTICALLY TRANSPARENT FACEPIECE WITH CHLORINATED POLYOLEFIN SEAMS

RELATED APPLICATIONS

This application is a continuation of application Ser. No. 08/656,701 filed Jun. 3, 1996 (now abandoned), which is a continuation of application Ser. No. 08/378,184 filed Jan. 25, 1995, now abandoned.

BACKGROUND OF INVENTION

1. Field of the Invention

The present invention relates to protective garments. More particularly, the present invention relates to protective garments used in hazardous environments.

2. Description of the Prior Art

Protective clothing of many types are well known for many and varied uses including protection from fire, chemical liquids and vapors and other harmful substances. Such clothing is often seen in suits for industrial workers, firemen, hazardous waste workers, chemical workers, race car drivers, airplane pilots and military personnel. Garments include not only complete hermetic suits, but also individual components such as trousers, jackets, gloves, boots, hats, head coverings, masks, etc.

Regulations restricting exposure to hazardous environments of various kinds, such as those contained in the Occupational Safety and Health Act, (OSHA) make it increasingly necessary to have better and more effective kinds of protective clothing. In particular, certain requirements by the U.S. Coast Guard and related requirements by other U.S. government agencies such as the Environmental Protection Agency (EPA) involve a total protective hermetic suit or unitary enclosures around the individual person to protect the worker from the widest possible range of hazardous materials.

Protective garments include woven and non-woven fabrics for disposable use. These garments are generally formed from various polymeric films or laminated plastic materials which are intrinsically resistant to dust or liquid penetration and in some cases impervious to chemical vapor penetration. The fabrics are generally spunbonded, meltspun or of non-woven thermoplastic material. The gas-tight suits must meet the permeation criterion of ASTM, test method D 739-85 and the liquid barrier suits must meet the penetration criterion of ASTM, test method F 903-84.

Encapsulated suits are required for "immediately dangerous to life and health" (IDLH) environments. These suits must be air tight and worn with a self-contained breathing apparatus (SCUBA). These are termed "HAZ MAT" suits and are designated as Level A suits under OSHA/EPA guidelines. These suits must be nonabsorbent, totally impermeable and resistant to a widest range of chemicals and reagents in liquid and/or gaseous forms. They should be fire resistant, meeting all the fabric requirements of the National Firefighters Protection Association, NFPA 1993. They should also be anti-static, meeting the fabric requirements of Anti-Static Charge Dissipation Test NFPA-992. Since these suits are worn by active individuals, they should be flexible, abrasion resistant, lightweight, and should maintain their impermeability while being used.

The garments presently available are almost invariably of thick construction and heavy in weight, and are often fabricated at least in part from materials impermeable to water or water vapor, such as natural and synthetic rubbers and elastomers, chlorinated rubbers, etc.

It is desirable to utilize an impermeable fabric which has a low melting point so as to have the ability to provide melt fusion bonding and which is chemically inert to a wide range of substances. The various fabric panels of the protective garment are usually overlapped and then sewn together. However, sewn seams cause needle holes which provide penetration by dust, liquids or vapors through the holes or the seams themselves and must be sealed by capping over them by adhesively bonding a suitable chemical resistant strip. Seams which are made with adhesives (hot melt or pressure sensitive) can peel apart upon flexing and kinking also can weaken the seam. The protective film or laminated plastic fabric seams must be fusion bonded sealed to form a barrier against solids (dust), gases and liquids while subjected to flexing in order to prevent toxic or harmful gases and liquids from permeating or penetrating the seams of the protective suit.

The optimum seam, which joins the various panels of laminated fabric or film to form a protective barrier against chemical vapors, should provide equal to or better impermeability than the laminated fabric against chemical vapors. Therefore, it is preferable to have a laminated fabric or film which melts to itself so that a tape of a plastic material having a melt index in the same range as the plastic barrier films can be used to fusion bond and form the seam. Fusion bonded in this manner, the seams of the laminated fabric or film provides excellent protection from contaminating dust, liquid and vapors.

When fabricating and bonding protective garments made from various plastic films and laminated plastic materials, the most difficult sealing problem is the bonding at stressed locations such as the zipper strip and the optically clear facepiece material to the plastic material which forms the protective barrier material for the garment.

A chemically resistant optically transparent facepiece and a zipper for opening and closing the suit must be sealed to the protective plastic film in a gas tight seal. The gas-tight commercial zippers available are usually found on strips of polyvinyl chloride (PVC), polyethylene (PE), butyl rubber or neoprene rubber. The optically transparent facepiece material is generally made from PVC, TEFLON®FEP (fluorinated ethylene-propylene copolymer), TEFLON®PFA (perfluoroalkoxy resin) or polycarbonate. The surface of the protective film or laminated film to be bonded to the protective garment is usually a polyolefin, a butyl rubber, neoprene, TEFLON®, a polyester, an aluminized polyester, a polyurethane or a polyvinyl chloride.

The fluorocarbon polymers have excellent properties regarding heat and chemical resistance and optical clarity and are the preferred materials for the facepiece component. However, the poor surface energy of the fluorocarbon resin film results in poor adhesiveness. This property becomes a difficult problem particularly in adhering dissimilar materials used in the manufacture of protective garments. Obviously, the facepiece is a most critical component of a protective garment suit. A suitable manner of attachment of the facepiece to the protective garment fabric has been a recurring problem both from the standpoint of manufacture and in providing the required rupture resistant and chemically impermeable seam at the attachment.

It is very difficult to form flexible gas-tight seals or bonds between many dissimilar materials such as fluorocarbon and halocarbon polymers, rubbers, polyolefins, plasticized polyvinyl chloride, neoprene, butyl rubber, silicones, polyester, etc. An adhesive or bonding system is needed which can form strong, flexible, gas-tight seals or bonds between chemically dissimilar materials particularly for fluorinated ethylene-propylene copolymer and a perfluoroalkoxy resin or polyethylene and PVC, etc. The conventional adhesives used to bond such dissimilar materials such as cyanoacrylates, epoxy resins, and other thermosetting materials have the disadvantages of forming brittle bonds that crack on flexing or develop leaks due to differences in the coefficient of thermal expansion between the two sheets of material that are sealed together. Pressure sensitive adhesives such as atactic polypropylene, some of the low molecular weight thermoplastic polyesters and acrylates either do not form a strong bond to the dissimilar materials or begin to leak after flexing and/or kinking. Standard hot melt adhesives depend on mechanical locking of the fiber on the surface such as fabrics and upon stress surface rupture (unitary film failure) occurs.

There is a difference between bonds that are heat sealed and bonds that are heat fused. A heat sealed bond involves the transformation of a solid material (hot melt adhesive) to a semi-liquid sticky state that flows and wets the surfaces, and which upon cooling, seals the dissimilar materials. Fusion bonding involves intermixing or alloying of molten resin under heat and pressure between at least two chemically dissimilar surfaces to be bonded. The flowing and intermixing causes at least the two dissimilar materials to yield a product with superior strength and sealing characteristics exhibiting total adhesive failure. Materials having the same chemical composition when subjected to heat fusion bonding will exhibit total cohesive failure.

The problems associated with the attachment of the facepiece involves the poor adhesion properties of the fluorocarbon per se along with the use of dissimilar materials as fabrics in the manufacture of protective garments.

U.S. Pat. No. 4,272,851 issued to Goldstein, which is herewith incorporated by reference, discloses a protective garment for use in hazardous environments. The body of the garment is formed of a non-woven spun bonded olefin having a polyethylene film laminated to one side (Tyvek®). The patent discloses a transparent front visor (not further identified as to the material used) sealed to an integral hood made of Tyvek®, a seam-bondable material. It is not specifically disclosed how the sealing of the facepiece is effected although the other seams are ultrasonically welded. This procedure results in a seam which has inadequate resistance to rupture from shearing. In order to give greater strength against shear stresses, the patent further discloses adding a binding along the folded back seam, which binding is sewed on by traditional stitching means. While the multiple layers so stitched may be somewhat more protective of the body material, the facepiece does not undergo this step and remains subject to rupture. (See FIG. 6 of the patent). Further, the patent does not disclose the use of optically transparent halocarbon, particularly, fluorocarbon plastics, more specifically, a fluorinated ethylene-propylene copolymer (FEP) or a perfluoroalkoxy resin (PFA) as a face visor. Polyvinyl chloride may be included to provide rigidity to the facepiece.

However, there exists a need to bond and seal chemically dissimilar materials so that the resulting bond is strong, flexible, impermeable to gases and liquids and when the bond fails from a sufficient of stress, the bond exhibits total material failure. Such a bond and seal is necessary for affixing an optically transparent facepiece to a protective garment.

SUMMARY OF THE INVENTION

In accordance with the present invention, a process and a product thereof is provided for forming a chemically resistant and a gaseous and liquid impermeable seal between chemically dissimilar materials such as an optically clear plastic facepiece and a protective garment.

The optically transparent plastic facepiece can be formed of polyvinyl chloride or an ethylene-vinyl alcohol copolymer, nylon, polyester, polycarbonate or an ionomer which is inert to chemical attack. Preferably, perfluoroalkoxy resin (PFA) or a fluorinated ethylene-propylene copolymer resin films are used. Most preferably, the fluorocarbon polymer films are used in combination with a polyvinyl chloride (PVC) polymer film. The PVC polymer provides rigidity and fire retardancy to the facepiece.

The surfaces of fluorocarbon plastics which are used as facepieces for protective garments do not normally permit bonding and must be subjected to an etch treatment. The fluorocarbon resin is etched at the contacting edge with an etchant selected from sodium-liquid ammonia solution, sodium-naphthalene/tetrahydrofuran or sodium naphthalene/ethylene glycol dimethyl ether complex.

Solid, liquid and gas resistant fabric materials which are employed for protective garments include chemical protective clothing, gloves, boots, containers, inter alia. Such fabric material comprises at least one layer of a plastic laminate formed by coextruding at least two layers of a thermoplastic polymer such as a low melting low linear low density polyethylene and an intermediate layer of a polar resin or a hydrophilic resin adhering to the combined layer a fabric scrim comprising a blend of polyester and cellulosic fibers which preferably is treated with a fire resistant and anti-static agent. Preferably, the polyethylene has a softening point of about 250°–350° F.

In accordance with this invention, the fabric material is manufactured into protective garments by fusion bonding the edges of a pair of panels of the fabric material. This forms the body elements of a protective garment so as to provide a reduction or elimination of sewn seams. The seam is formed by the laminates overlapping or being in abutment. Preferably, a chlorinated polyolefin resin or film as described below is used to produce under simultaneous heat and pressure a chemically resistant fusion bonded seal between the panels of the fabric materials and dissimilar films, such as in the facepiece and zipper components.

In order to give greater strength against shear stresses, the seam is preferably reinforced by traditional stitching means. A tape of similar plastic material is applied directly and continuously over the stitched seams and then fusion bonded.

A method is provided for forming and seam sealing a plastic facepiece onto the hood of a protective garment such as a unitary overgarment manufactured from the laminated fabrics described above.

The method comprises the steps of:

applying a film consisting of a low melting chlorinated polyolefin along the edges of an optically transparent plastic film suitable for use as a facepiece;

positioning the facepiece to contact the laminated fabric surrounding a cutout in the hood of the garment sized to accommodate the facepiece; and then heating and applying pressure to form a fusion bond between the facepiece and the laminated fabric.

Suitable chlorinated polyolefins resins include chlorinated polyethylene and polyvinylidene chloride which will form fusion bonds between dissimilar materials when subjected to a sufficient dwell period under heat and pressure.

Advantageously, the facepiece comprises two layers of different film material.

It is an object of the invention to provide a hazardous environment protective garment or article of clothing having seams formed by fusion bonding.

It is another object of the invention to provide a protective garment manufactured from a bonding material of a chlorinated polyolefin capable of fusion bonding dissimilar materials which greatly increases the strength and impermeability of the seam and yet is economically feasible.

It is yet another object of the invention to provide a protective garment with an optically transparent facepiece which is fusion bonded to the laminated fabric construction of the garment and is resistant to cohesive failure and resistant to a wide range chemical vapors and liquids.

It is a further object of the invention to provide liquid and vapor impermeable and chemically resistant seams using a chlorinated polyolefin bonding material.

Other objects and a fuller understanding of the invention will be had by referring to the following description and claims taken in conjunction with the accompanying drawings.

DESCRIPTION OF THE PREFERRED EMBODIMENTS

Figure 1:
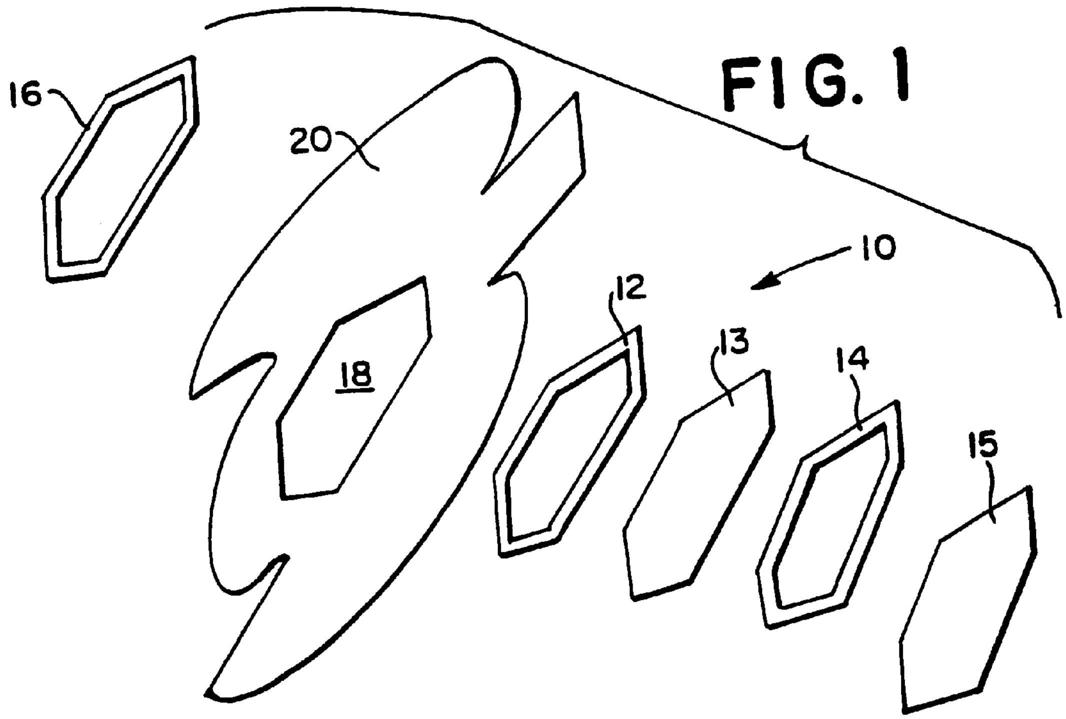
FIG. 1 is an exploded view of the facepiece construction of the invention showing component assembly from the inside of the protective garment.

As shown in FIG. 1, there is provided one embodiment of the present invention of the facepiece assembly 10 comprising seam tape 16, consisting of a chlorinated polyolefin film (described in more detail below), that is positioned outside of the hood portion of protective garment 20. Preferably, it is colored to match the color of the protective garment 20. The inside construction involves bonding material 12, an optically transparent fluorocarbon film 13, bonding material 14, and an optically transparent polyvinyl chloride film 15. The fluorocarbon film is preferably a TEFLON® polymer such as FEP or PFA used in a thin film of about 10 mils. The polyvinyl chloride component 15 is formed from films of about 40 mils in thickness. The chlorinated polyolefin film bonding materials 12 and 14 are from about 10 to 40 mils thick. The polyvinyl chloride polymer provides rigidity and fire retardancy to the facepiece assembly. After the above identified components are positioned as illustrated in FIGS. 1 and 2 within the hood portion cutout 18, they are subjected to a fusion bonding process, discussed herein below.

Figure 2:
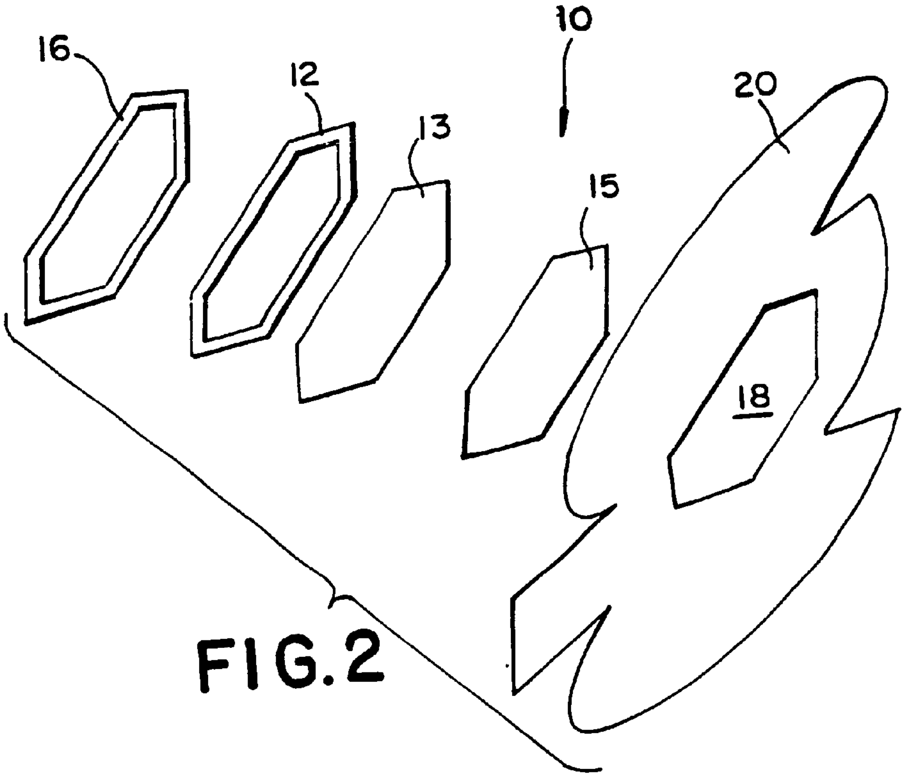
FIG. 2 is an exploded view of another embodiment of the facepiece construction of the invention showing component assembly from the outside of the protective garment.

FIG. 2 shows another aspect of the facepiece assembly 40 comprising the components positioned on the outside of the hood of the protective garment 20. This embodiment eliminates the gasket material tape 14 without any detriment to the facepiece assembly.

Figure 3:
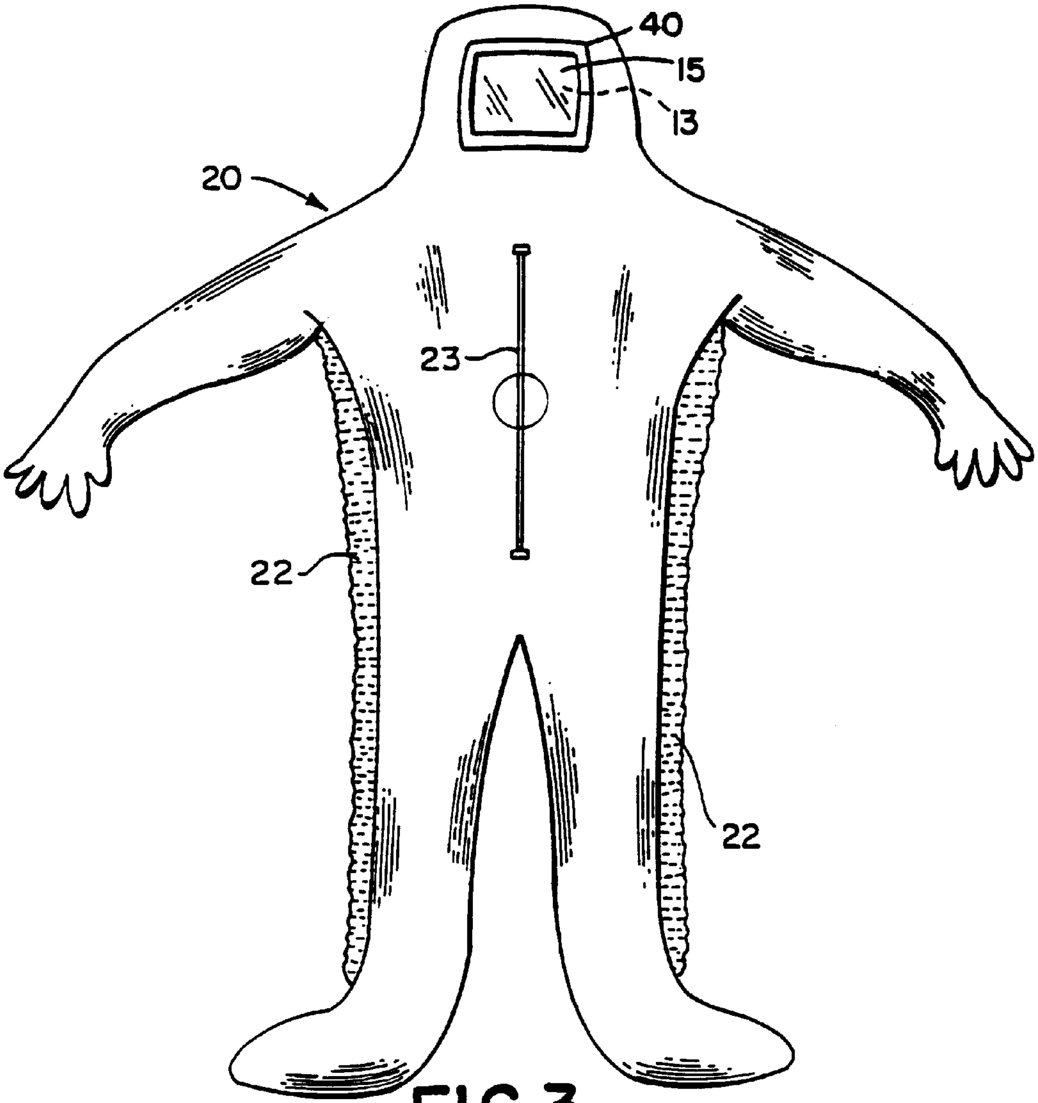
FIG. 3 shows a protective garment with the facepiece sealed according to this invention.

As illustrated in FIG. 3, a protective garment 20 is prepared from a fabric comprising films with an outer layers of low density polyethylene. The garment 20 is provided with an optically a transparent facepiece 40 and a zipper strip 23. The facepiece 40 and the zipper strip 23 can be formed from thick films of polyvinyl chloride or an ethylene-vinyl alcohol copolymer layer similar to the film used in the interior of the garment 20. The facepiece 40 can also comprise a barrier film such as a TEFLON® (PFA, FEP), nylon, polyester, or an ionomer which is optically transparent and inert to many chemicals. Preferably, perfluoroalkoxy resin (PFA) or fluorinated ethylene polyethylene copolymer (FEP) is used. Suitable ionomers are described in U.S. Pat. No. 4,799,436, which is herein incorporated by reference.

The garment 20 is sealed with strips of the chlorinated polyolefin film along with, facepiece 40 and zipper strip 23. Embossments 22 of the strip 21 provides flexibility and strength to the seams.

The entire fabric of the protective garment 20 can be embossed to minimize wrinkling of the suit as well as provide enhanced flexibility and strength.

Figure 4:
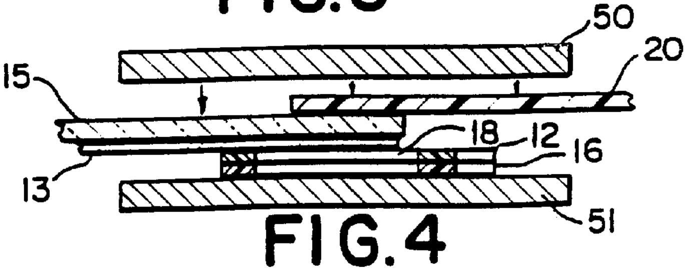
FIG. 4 is an enlarged cross-sectional view showing the seam construction of the present invention according to FIG. 2.

FIG. 4 is an enlarged cross-sectional view showing the assembly of the facepiece construction as shown in FIG. 2.

A heating element (not shown) is located within platen 40 which is designed to provide the necessary heat and pressure for fusion bonding. It is preferable that the other platen 41 also be provided with a heating element such as a wire or band.

As illustrated in FIG. 4, a method is provided for fusion bonding an optically transparent plastic facepiece onto the body of a protective garment wherein the garment consists of dissimilar flexible film material comprising the steps of:

applying a chlorinated polyolefin a bonding material as gasket 12 along the etched edges 19 of an optically transparent plastic film suitable for use as a facepiece assembly 40 comprising a fluorocarbon polymer film 13 of about 10 mils thickness and a polyvinyl chloride film 15 of about 40 mils thickness;

positioning the facepiece assembly 40 against the fabric film of the protective garment along the perimeter of opening 19 in the hood portion of the garment to form a composite;

place the composite between platens 50 and 51; and then heating the composite to an effective temperature to cause at least two of the films to flow about the edge and sides of the facepiece to form a fusion bond seam and placing the composite under pressure for a dwell period until a chemically resistant liquid and a gas impervious seal is formed only about the edges and sides of the facepiece.

A heating element (not shown) is located within platen 50 which is designed to provide the necessary heat and pressure for fusion bonding. It is preferable that the other platen 51 also be provided with a heating element such as a band or wire. In a preferred method, the composite components are sewn together and then subjected to the fusion bonding step. In this case, a capping strip 16 of the same chlorinated polyolefin material is applied to the seam portion and then subjected to fusion bonding.

Figure 5:
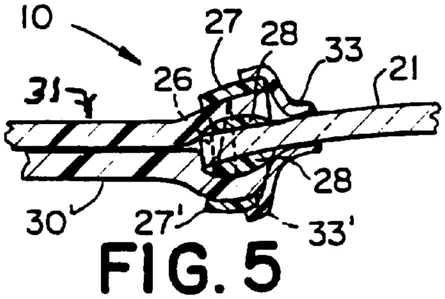
FIG. 5 is an enlarged cross-sectional view of the seam sealing zipper construction.

FIG. 5 illustrates a method of seam sealing of zippers with dissimilar materials such as polyvinyl chloride or butyl rubber or neoprene. The fabric layers 30 and 30' which consist of the same structure as the dissimilar flexible film material of the protection garment 20 of the FIG. 3 are cut out and an intermediate fabric 21 is placed along it edges. A fusion bonding compound such as chlorinated polyolefin film is used as a gasket 28. A thread 26, preferably a high tensile fiber, is sewn through the layers 30 and 30' and fabric 20. The layers 30 and 30' are then fusion bonded together along the edges of the fabric 20. The threaded area is then capped so as to prevent any vapors from penetrating through pinholes that may exist and to further strengthen the area. This maybe done from one or both sides. A suitable method of capping utilizes a strip of a chemical resistant material such as a chlorinated polyolefin film 11. The strips can be heat fused over the area. Heat fusible strips 33 and 33' are compatible with the material used for the zipper seam and the flexible fabric of the protective garment and form a fusion bond along the edges of the fabric 21.

Figure 6:
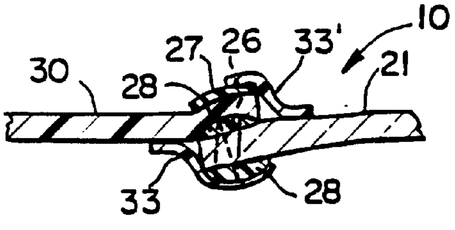
FIG. 6 is another embodiment showing an enlarged cross-sectional view of the seam sealing zipper construction.

Alternatively in FIG. 6, the fusion bonded laminated fabric seam is placed only on one side of the dissimilar materials. Chlorinated polyolefin 28 is placed between the sewn seam. The outer seam holes are capped with a film or resin film 27. The inside holes are fusion bonded with a compatible tape, such as FEP or PFA sealing tape or preferably a chlorinated polyolefin film. Optionally, an FEP pressure sensitive tape 33 and 33' can be applied over the back seam holes and along the edges where the two layers overlap 33 and 33'.

In order to maximize the impermeability of the laminated structure of chemically dissimilar flexible film material used for making protective garments, the films should be composed of a coextrusion or laminate which includes an ionomer, cellulose acetate, nylon or the ethylene-vinyl alcohol copolymer interposed between two chemical resistant layers of low density polyethylene. Additionally, the film itself must be without pin holes, outer fibers or any porosity which lessen the barrier resistance of the actual film. In the fusion bonding process, a continuously formed laminate fabric gains the strength of the woven or non-woven fabric without interfering with barrier properties of the film. It enhances the resistance to flex cracking, wrinkles and failure from tearing and bursting to the total laminated fabric. Because of the absolute fail safe requirements of chemical protective clothing and the need for easily putting the suit on or taking it off, an inner layer of film should also be used to form a sandwich with the fabric. This maximizes the flexibility of a given construction with the total plastic film barrier being split into two layers and being easier to flex than one thick layer.

Furthermore it is essential that the seams throughout the garment as well as along the facepiece and zippers be resistant to failure so that they are fusion bonded. It is critical in this invention that a low density polyethylene be utilized since medium and high density polyethylene do not possess the heat sealing features necessary for the invention.

The thickness of the polyethylene films used in the body of the garment 20 is generally in the range of about 0.8 to 10 mils. The total thickness of the garment 20 is generally about 10–30 mils. The ethylene-vinyl alcohol copolymer film serving as an inner liner preferably contains about 20 to 70% vinyl alcohol, although, it can also contain ionomer residues.

The ethylene-vinyl alcohol copolymer layers in the coextrusion films or laminates range in thickness from about 0.1 to 2.0 mils and can comprise one or more layers. The overall thickness of these co-extruded films is preferably about 2 to 10 mils depending upon the ultimate use. Generally, the other resin layers are polyethylene, nylon or SURLYN (ionomer) in addition to the ethylene-vinyl alcohol copolymer layer.

Other intermediate fabrics for the inner layer which are used in making the laminated fabric are many and varied. They can be, but are not limited to cotton, KEVLAR, NOMEX, PBI, rayon, wool, silk, polyester, nylon, polyethylene, polypropylene or other high tensile strength fibers.

Low melting chlorinated polyolefin resins, such as chlorinated polyethylene (CPE) and polyvinylidene chloride (PVDC), will form such interlayer fused bonds between dissimilar materials when fusion bonded under moderate pressure.

With the exception of plasticized PVC, cross-linked thermoplastics do not generally contain plasticizers or extender oils. In rubbers and a number of special applications in which these auxiliaries are used, these additives reduce the cross-linking effect to a greater or lesser extent. In this respect, aromatic oils have the most adverse effect, whereas naphthionic and paraffinic oils exhibit only a slight effect. Plasticizers such as dioctyl phthalate and alkylbenzenes may have some influence. Plasticizers, however, usually have a negative effect when melt bonding dissimilar materials. And, PVC is usually too rigid without plasticizers to be used in this application.

The present invention allows one to bond together chemically dissimilar materials, such as two surfaces of different polarities or different functionalities. Representative examples include PVC, butyl rubber, neoprene, polyethylene, polypropylene, rubbers, halocarbons, co-polymers of polyolefins such as ethylene vinyl alcohol and ethylene-vinyl acetate, polytetrafluoroethylene and derivatives thereof. When using PVC, neoprene and other rubbers, the surfaces of these materials must be cleaned with an organic solvent such as toluene, methyl ethyl ketone (MEK), chlorinated solvent, etc., to remove excess plasticizers, talc, and other nonblocking materials that may be present. In the case of the fluorocarbon polymer materials, the bonding surface is advantageously treated with an etching agent such as Tetra etch® to produce a polar bonding surface. While a polyurethane primer may be used on any of the above surfaces to improve adhesion, it is most preferable to use it on the halocarbon materials and surfaces.

Halogenated polyolefins, such as chlorinated polyethylene, have known flame-resistant properties. We have tested various different halogenated containing polyolefins and resins such as polyvinyl chloride (PVC), polyvinylidene chloride (PVDC), polyvinylidene-propylene fluoride (PVPF), (Kymar), tefzel, neoprene resins, etc. It was found that the chlorinated polyolefins gave the strongest bonds. Normally, flame-resistant halogenated resins have poor adhesion. However, the chlorinated polyolefins in the present inventions exhibited surprisingly good adhesion.

Optionally, the polyolefin film may be put through a corona discharge if an anti-static product is desired. Alternatively, an anti-static additive may be added to give the same effect.

One embodiment of the present invention places a chlorinated polyolefin, preferably chlorinated polyethylene, between two chemically dissimilar films and subjects the film composite to heat and pressure simultaneously until fully cured. One of the chemically dissimilar films are selected from the group of polyethylene, butyl rubber, chemically treated polytetrafluoroethylene and derivatives thereof. The other chemically dissimilar films are selected from the group of polyvinyl chloride, neoprene, chemically treated polytetrafluoroethylene and derivatives thereof.

The applied pressure for fusion bonding advantageously ranges between three and twenty pounds per square inch.

The dwell period for complete temperature is preferably between 200° F. and 350° C. and must cause the film composite to flow. The time for complete curing usually takes less than an half-hour and can sometimes be done within five minutes.

To assist adhering the films together, a polyurethane coating may be applied to the dissimilar films before they are fusion bonded. This is especially advantageous for the polyvinyl chloride, neoprene, butyl rubber and fluorocarbon films.

Optionally, the film composites may be sewn together for added strength before applying the heat and pressure. Alternatively, a scrim may be attached to the film composite for added strength.

The fabric material used in the invention may comprise a polymeric material which is a single layer or multi-layered construction, as desired. They are generally thermoplastic non-woven fabrics such as spunbonded polyester, meltspun polyester, hydroentangled polyester, and the like. Illustrative of the polymer material are polyolefins such as polyethylene, polypropylene, other polymers derived from ethylenically unsaturated monomers including vinyl alcohol, vinyl chloride, vinylidene chloride, and the like. In addition, polyesters, nylon or mixed fibrous webs may be used. Most preferred are web panels comprising TYVEK®, a spunbonded non-woven polyethylene web (E.I. DuPont de Nemours & Company, Inc. Wilmington, Del.).

Alternatively, the web panels or garments of the present invention may be of laminated form, comprising a plurality of associated layers of materials such as those previously described in respect of mono-layer panels. In such laminates, the respective layers may be coextruded or otherwise conformed, or those layers may be joined to one another subsequent to their initial formation, as for example by elevated temperature interpenetration, chemical reactions between functional groups on opposing faces in the laminate, etc. A particularly preferred laminate for the present invention comprises TYVEK® laminated or coated with one or more layers of polyethylene homopolymer, ethylene/vinyl acetate copolymer, ethylene/vinyl alcohol copolymer and vinylidene chloride/vinyl chloride copolymer.

Liquid penetration resistant tapes may be placed over the seams to provide additional strength and to prevent pinholes at the seams. The tape may be formed similarly of any suitable material which is satisfactory to provide the desired liquid penetration to the seam assembly. The tape is suitably a mono-layer or a laminate material formed of materials such as polyolefins, polymers derived from other ethylenically unsaturated monomers, laminates thereof, etc.

More generally, the tape closure may be affixed to the second side of the adjacently adjoined panels shown in FIG. 3 in any suitable manner such as by elevated temperature interpenetration, chemical bonding, adhesive bonding, etc.

In the neck region of the garment, the body portion may be joined to a hood (not shown). The hood has a frontal piece of suitable transparent material such as MYLAR®, polycarbonate, etc. Preferably, TEFLON® (FEP) or PFA in combination with PVC.

U.S. Pat. Nos. 5,082,721, 5,491,022, 5,494,720, 5,543, 011 and 5,692,935 which are incorporated by reference disclose fabric materials for use in manufacturing protective garments that can be used in the present invention.

It is preferred that the chlorinated polyolefin has a low melt flow temperature. The chlorinated polyolefin film or resin is advantageously 10 to 40 mils thick. Short chain monomeric units of preferably two to four carbons in the chlorinated polyolefin film provide excellent bond strength at low temperatures.

A number of examples using these low melting chlorinated polyolefin materials are given along with the procedure. Chlorinated polyethylene is designated as "CPE". All bonds appear to fail by total cohesive failure.

Examples 1–5 follow the same general procedure. Once the films are assembled together, the resulting film composite is placed under pressure varying from three to twenty pounds per square inch, while simultaneously being heated at a temperature ranging from 200° F. to 350° F. The film composite is held under these conditions for a period of time ranging from five to twenty-five minutes. The film composite is then removed from these conditions and the process is complete.

Example 6 particularly describes optimum procedural conditions for one embodiment of the present invention.

Example 7 is a chart comparing the bond strengths of the present invention versus conventional products, Exxon Escor ATX-350 and ATX-140 and Dupont Nucrel 360. The Exxon products are acid terpolymers, while the Dupont product is an ionomer of ethylene and methacrylic acid.

EXAMPLE 1

One film having a polyethylene surface is placed on top of a solvent-cleaned CPE layer with an approximate thickness ranging from twenty to forty mils. A solvent-cleaned PVC film (such as a zipper segment) is placed beneath the CPE layer, and a polyurethane coating is optionally applied to the PVC film before placement. Once completed, the film composite may optionally be sewn together or sewn to a scrim.

EXAMPLE 2

One film having a polyethylene surface is placed on top of a solvent-cleaned CPE layer with an approximate thickness ranging from twenty to forty mils. A chemically treated (Tetra-etch®) polytetrafluoroethylene type film is placed beneath the chlorinated polyethylene CPE layer, and a polyurethane coating is optionally applied to the Teflon film before placement. Once completed, the film composite may optionally be sewn together or sewn to a scrim. Tetra-etch® is a sodium naphthalene/ethylene glycol dimethyl ether complex marketed by W.L. Gore & Associates, Inc., Flagstaff, Ariz.

EXAMPLE 3

One film having a chemically treated (Tetra-etch®) polytetrafluoroethylene type surface is placed on top of a solvent-cleaned CPE layer with an approximate thickness ranging from twenty to forty mils. A solvent-cleaned neoprene film (such as a zipper segment) is placed beneath the CPE layer, and a polyurethane coating may optionally be applied to both the polytetrafluoroethylene and neoprene films before placement. Once completed, the film composite may optionally be sewn together or sewn to a scrim.

EXAMPLE 4

One film having a butyl rubber surface is solvent-cleaned and placed on top of a solvent-cleaned CPE layer with an approximate thickness ranging from twenty to forty mils. A solvent-cleaned neoprene film (such as a zipper segment) is placed beneath the CPE layer, and a polyurethane coating may optionally be applied to both the butyl rubber and neoprene films before placement. Once completed, the film composite may optionally be sewn together or sewn to a scrim.

EXAMPLE 5

One film having a butyl rubber surface is solvent-cleaned and placed on top of a solvent-cleaned CPE layer with an approximate thickness ranging from twenty to forty mils. A chemically treated (Tetra-etch®) polytetrafluoroethylene type film is placed beneath the CPE layer. Once completed, the film composite may optionally be sewn together or sewn to a scrim.

EXAMPLE 6

One film having a butyl rubber surface is solvent-cleaned and placed on top of a solvent-cleaned CPE layer with an approximate thickness ranging from twenty to forty mils. A chemically treated (Tetra-etch®) polytetrafluoroethylene type film is placed beneath the CPE layer, and a polyurethane coating is applied to both the butyl rubber and polytetrafluoroethylene film before replacement. Once completed, the film composite may optionally be sewn together or sewn to a scrim.

The film composite is placed under pressure of twenty pounds per square inch, and heated at a temperature of 250° F. The composite is kept under these conditions for about twenty-five minutes. The film composite is then removed from these conditions, and the process is complete.

Chart #1 Bonding Results

| | CPE | Exxon Escor ATX-350 | Exxon Escor TC-140 | Dupont Nucrel 360 |
|---|---|---|---|---|
| Interceptor *Suit Material | very good | very good | very good | good |
| PVC zipper | very good | poor | poor | poor |
| PVC zipper w/Chemlok | very good | good | fair | fair |
| Etched Teflon facepiece | fair | very good | poor | fair |
| Etched Teflon w/Chemlok | good | very good | good | good |
| Etched Forcefield suit material | fair | very good | poor | fair |
| Etched Forcefield suit material w/Chemlok | good | very good | good | good |
| Neoprene zipper | poor | good | fair | poor |
| Neoprene zipper w/Chemlok | good | good | good | fair |
| Butyl suit material | poor | very good | good | poor |
| Butyl suit material w/Chemlok | very good | very good | very good | fair |

*"Interceptor" is a trademark for HAZ MAT protective garments made by Lakeland Industries, Inc.

Although the invention has been described with preferred embodiments, it is understood that variations and modifications may be employed without departing from the concept of the invention as defined in the following claims.

What is claimed is:

1. A process for bonding an optically transparent facepiece onto a protective garment wherein said garment fabric and flurocarbon facepiece consist respectively of chemically dissimilar flexible films said garment fabric material comprising polyethylene, said process comprising the steps of:

a) applying a bonding agent consisting essentially of chlorinated polyolefin film seam layer along the inside edges of an aperture in said garment fabric material;

b) placing said facepiece film in contact with said chlorinated polyolefin film;

c) applying a chlorinated polyolefin film seam layer to the side of said facepiece not in contact with the chlorinated polyolefin film;

d) applying a polyvinyl chloride film over the seam layer of step c), and then;

e) heating the composite thus obtained to an effective temperature to cause the chlorinated polyolefin films and garment fabric material to flow about the edges and sides of the facepiece to form a fusion bond seam and placing the composite under pressure for a dwell period until a chemically resistant liquid and gas impervious seal is formed only about the edges and sides of said facepiece.

2. The process of claim 1 wherein said chemically different film includes a polyurethane coating.

3. The process of claim 1 wherein the facepiece and chlorinated polyolefin films each have a polyurethane coating on the surface adjacent to said film fabric material.

4. The process of claim 1 wherein the chlorinated polyolefin film is about 10 to 40 mils thick.

5. The process of claim 1 wherein the chlorinated polyolefin comprises two to four carbons in its monomeric units.

6. The process of claim 1 wherein the chlorinated polyolefin film is chlorinated polyethylene.

7. The process of claim 1 wherein the chlorinated polyolefin film is pretreated by corona discharge to produce an anti-static product.

8. The process of claim 1 wherein the chlorinated polyolefin film is pretreated with anti-static additives to produce an anti-static product.

9. The process of claim 1 wherein the temperature in step c) is between about 200° F. and 350° F.

10. The process of claim 1 wherein the pressure in step c) is between about three and twenty pounds per square inch.

11. The process of claim 1 wherein the time to keep the composite under heat and pressure in step c) is between about five and twenty-five minutes.

12. The process of claim 1 further comprising the step of sewing the composite together prior to step c).

13. The process of claim 1 further comprising the step of attaching a scrim to the interior portion the film composite.

14. A protective clothing garment made in accordance with the process of claim 1.

15. A garment made in accordance with the process of claim 1.

* * * * *